United States Patent [19]

Koskinen et al.

[11] Patent Number: 5,016,851
[45] Date of Patent: May 21, 1991

[54] ATTACHMENT SYSTEM FOR THE HOLDER OF THE OPERATING DEVICE OF A RADIOPHONE

[75] Inventors: Pentti A. Koskinen, Halikko; Antti S. Timari, Sääksjärvi, both of Finland

[73] Assignee: Nokia Mobile Phones, Salo, Finland

[21] Appl. No.: 468,372

[22] Filed: Jan. 22, 1990

[30] Foreign Application Priority Data

Feb. 3, 1989 [FI] Finland ................................ 890539

[51] Int. Cl.⁵ .......................................... F16M 11/00
[52] U.S. Cl. .................................. 248/278; 248/183; 403/97; 403/87; 403/74
[58] Field of Search ............... 248/278, 476, 477, 481, 248/485, 179, 183, 288.3; 403/97, 87, 73, 74, 61

[56] References Cited

U.S. PATENT DOCUMENTS 2,691,532 10/1954 De Eldon e Haynét ......... 403/97 X
4,472,982 9/1984 Nishikawa ....................... 403/97 X Primary Examiner—Alvin C. Chin-Shue
Attorney, Agent, or Firm—Darby & Darby

[57] ABSTRACT

An attachment system for the holder of the operating device of a radiophone allows the holder to be turned into various directions step-by-step. The attachment system is formed of a joint (8, 9) comprised of three parts, which parts with grooved surfaces are turnable in relation to each other and lockable in the desired position by using their grooved surfaces and an attachment piece (11).

3 Claims, 1 Drawing Sheet

ATTACHMENT SYSTEM FOR THE HOLDER OF THE OPERATING DEVICE OF A RADIOPHONE

BACKGROUND OF THE INVENTION

The present invention relates to an attachment system for the holder of the operating device of a radiophone, particularly a car radiophone, with which attachment system the holder can be turned into various directions step by step.

The user interface of a radiophone is formed of an operating device and its holder. The operating device is kept in its holder, when it is not in use, that is when a telephone conversation is not taking place or when a telephone conversation takes place without lifting the receiver.

The holder of a operating device can be attached to the control board or to another suitable place where the radiophone is located. Previously this attachment has been rigid so that the operation device was always in the same position in its holder. Especially with the car radiophone, this may force the user into ergonomically unpleasant positions when reaching for and handing the operating device. The use of the keyboard of the operating device may also be difficult, if the user can not see the keyboard clearly. Also to guarantee the general safety for vehicular traffic, it is important that the operation device be easily accessible and usable.

SUMMARY OF THE INVENTION

The object of the present invention is overcome the above mentioned difficulties. The invention deals with an attachment system for the holder of the operating system that permits the holder be turned into various directions step-by-step so the operating device can be placed in the most satisfactory ergonomic and easy-to-use position for the user. In accordance with the present invention this has been achieved by placing a joint between the holder and the radio device, which joint makes it possible to turn the holder step by step in two directions and also to rotate it around its vertical axle.

The attachment system for the holder according to the invention includes a joint comprised of three parts, which parts have grooved faces that are placed against each other, whereby the holder, which may include front and rear pieces, can be locked in the desired position by adjusting the joint parts in relation to each other, while the grooved faces settle against each other. The holder is fastened in this desired position by using an attachment piece the extends through the rear piece part of the holder and the joint, and the counter pieces of the attachment piece. A curved grooved face, that is compatible with the first curved grooved piece of the joint, is formed on the rear piece of the holder.

According to one embodiment of the invention, in order to make the desired position changeable, a spring is installed attachment piece on the other side of the rear piece of the holder from attachment piece. When the holder is lifted upwards, the spring comprises and the connection of the pieces becomes looser, and they can be turned into a new position in relation to each other. The piece are locked in their positions under the influence of the spring pressing the grooves and the pieces against each other when the holder is released.

According to another embodiment of the invention the joint is fastened solidly in place using a screw that penetrates the joint and the rear piece of the holder. The holder is tightened to the desired position with a bolt. If it is desired to change the position, the bolt has to be opened.

The characteristics of the invention are presented in the enclosed claims.

BRIEF DESCRIPTION OF THE DRAWING

The invention is illustrated in more detail in the following figures, where:

In FIG. 1 the holder comprises a front piece (1) and a rear piece (2). In the middle of the rear piece (2) there is formed an outwardly by convex portion (3) that has horizontal grooves on its outside surfaces. It has a longitudinal opening or slot that is vertical surfaces. With respect to the grooves (not shown in the figure). The attachment piece, which in this embodiment is a pin (11), is able to turn in this opening when the position of the joint is altered. One side (7A) of a smooth counter piece (7) is formed convex, which enables it to be pressed against the correspondingly concave inside face surface of portion (3) formed in the rear piece (2) so it is able to slide along this surface. A concave surface 8A of a first piece (8) is placed against the outer convex surface of position (3) formed on the rear piece (2) the concave surface of the first piece (8) is grooved so that its grooves press into the corresponding grooves of the outer surfaces of portion (3) of the rear piece (2). The other side of the first piece (8) is planar and it is grooved radially. The second piece (8) of the joint is the same shape as the first piece, (8) but it is installed the other way around so that the planar, radially grooved surface (8B) of the second piece (8) and the corresponding surface of the first piece (8) are placed against each other and the grooves press against each other. As a result, it is possible to rotate them in relation to each other. A horizontally grooved convex surface 9A of third piece (9) of the joint is pressed against a concave, similarly grooved rear face of the second piece (8'). An opening or slot vertical to the grooves is formed through the third piece (9), in order to make it possible to move the piece (9) linearly in relation to the attachment piece (11). Counterpiece (10) has a convex surface (10A) from which attachment piece pin (11) projections. A convex recess is formed in the other side of the third piece (9) in to which the counter piece (10) fits, and along which it is able to slide when the joint is moved. The joint (8, 9) is attached to the control board or to another suitable place using the holes (9B) of the brackets of the third piece (9).

Figure 1:
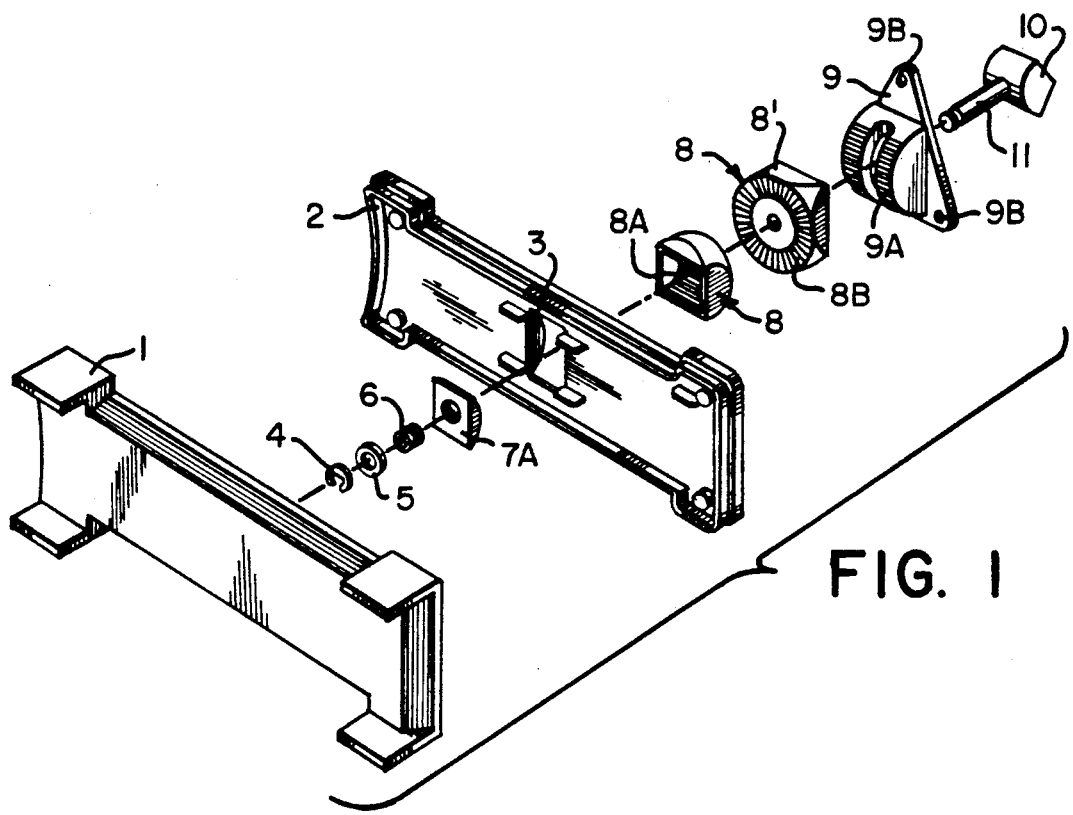
FIG. 1 is an exploded view of the attachment system for the holder, where the joint is fastened using a pin part and a spring.

This arrangement makes it possible to adjust the position of the holder step-by-step to any desired position by linearly adjusting, with the assistance of the grooves the third piece (9) in relation to the second piece (8) of the joint and/or by rotating the second piece (8') in relation to the first piece (8) around the attachment piece (11) that extends through the joint and/or by adjusting the first piece (8) of the joint linearly in relation to the convex surface or portion (3) formed in the rear piece (2) of the holder.

The pin (11), that is mounted to the counter piece (10) extends through the opening in the third piece (9), the holes of the first and the second pieces (8, 8') the opening of the potion (3) of the holder and the counter piece (7) placed behind the opening. A spring (6) is placed around the end of pin 11 that sticks out from the other side of the counter piece (7). The spring is pressed between the counter piece (7) and a flat washer (5) that is held on the end of the pin 11 by a locking clip (4) that is attached outermost around the end of the pin. This attachment system makes it possible to lock the holder in the desired position by lifting the holder, whereby the spring (6) is compressed and the pieces of the joint (8, 8' 9) become loose so that it is possible to move them into various positions in relation to each other. When the holder is rebeased again, the spring (6) returns to the its original position and presses the pieces of the joint against each other.

Figure 2:
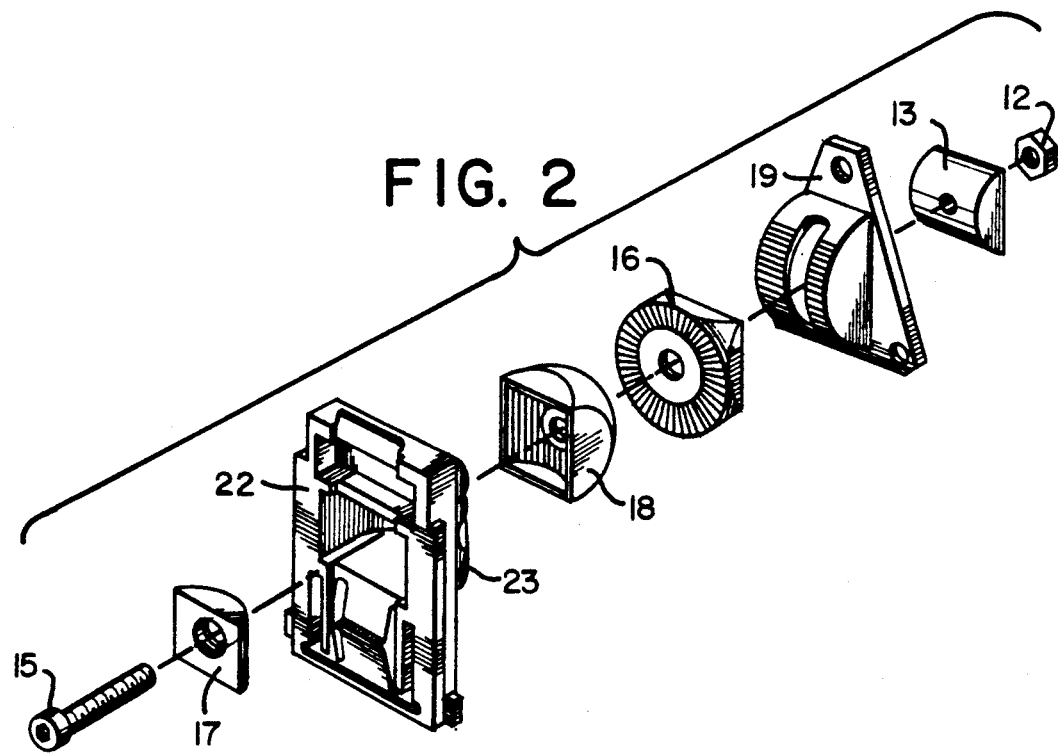
FIG. 2 is an exploded view of the attachment system of the holder, where the joint is fastened using a screw and a bolt.

According to the embodiment of the invention presented in the FIG. 2, a screw 15 which extends through a counter piece (17), a holder (22), the joint (16, 18, 19) and another similar counter piece (13), is used as an attachment piece. The screw is tightened using a bolt (12) so that the holder is attached in the desired position while the grooves of the joint press against each other. In order to alter the position of the holder, the bolt (12, has to be loosened so the pieces of the joint can move in relaion to each other.

We claim:

1. Attachment system for a holder of the operating device of a radiophone with which the holder can be turned step-by-step in various directions, comprising:
    A. a grooved convex surface on the outside of a rear portion of the holder, a smooth concave surface being located on the other side opposite the convex surface thereof, and said holder defining a slot in the surface of the rear portion that is generally perpendicular to the grooves;
    B. a joint including
        (i) a first joint piece with a grooved concave surface on one side that corresponds to, and is placed against, the convex surface of the holder, said first piece defining an opening therein, the other side of the first joint piece being a planar surface having radial grooves,
        (ii) a second joint piece with a similar shape to the first joint piece including a grooved concave surface on one side, a planar radially grooved surface on the other side, and an opening, said second joint piece being placed so that its planar surface is against the planar surface of the first joint piece, and
        (iii) a third joint piece with a convex grooved surface on one side that corresponds to, and is placed against, the concave surface on the one side of the second joint piece, a smooth concave surface being located on the other side opposite the convex surfaçe thereof, said third joint piece defining a slot through its convex surface that is generally perpendicular to the grooves therein;
    C. first and second counterpieces with smooth convex surfaces on one side, the surface of the first counterpiece being placed against the concave surface of the rear portion of the holder and the surface of the second counterpiece being placed against the concave surface of the third joint piece, said smooth surfaces of said counterpieces being formed so that they are able to slide along the smooth concave surfaces of the holder and the third joint piece respectively;
    D. an attachment piece that extends between the first couterpiece, the rear portion of the holder, the joint pieces and the second counterpiece, said attachment piece being movable in the slots in the rear portion of the holder and the third joint piece; and
    E. locking means joining the counterpieces to the attachment means, whereby turning of the joint pieces in relation to each other allows the holder to be set in various positions.

2. Attachment system in accordance with claim 1, characterized in that,
    the attachment piece is a pin mounted to the second counterpiece with its other end extending through the first counterpiece, and
    the locking is formed of a spring, a flat washer and a locking clip said spring being located around the pin between the first counterpiece and the flat washer, and the locking clip being located between the washer and the end of the pin.

3. Attachment system in accordance with claim 1, characterized in that the attachment piece is a screw and the locking device is a bolt.

* * * * *